United States Patent
Cao

(10) Patent No.: US 12,197,252 B2
(45) Date of Patent: Jan. 14, 2025

(54) FLEXIBLE SCREEN SUPPORT DEVICE AND INTELLIGENT TERMINAL

(71) Applicant: ZTE CORPORATION, Shenzhen (CN)

(72) Inventor: Li Cao, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 180 days.

(21) Appl. No.: 17/923,400

(22) PCT Filed: May 27, 2021

(86) PCT No.: PCT/CN2021/096265
§ 371 (c)(1),
(2) Date: Nov. 7, 2022

(87) PCT Pub. No.: WO2021/249195
PCT Pub. Date: Dec. 16, 2021

(65) Prior Publication Data
US 2023/0194043 A1 Jun. 22, 2023

(30) Foreign Application Priority Data
Jun. 12, 2020 (CN) .......................... 202010538106.2

(51) Int. Cl.
*G06F 1/16* (2006.01)
(52) U.S. Cl.
CPC .......... *G06F 1/1652* (2013.01); *G06F 1/1681* (2013.01)
(58) Field of Classification Search
CPC ...... G06F 1/1681; G06F 1/1652; G09F 9/301; G09F 9/00
See application file for complete search history.

(56) References Cited

U.S. PATENT DOCUMENTS 9,164,547 B1 * 10/2015 Kwon .................... G06F 1/1652
9,337,434 B2 * 5/2016 Lindblad ............... G06F 1/1652
(Continued)

FOREIGN PATENT DOCUMENTS

CN 203162459 U 8/2013
CN 204516278 U 7/2015
(Continued)

OTHER PUBLICATIONS

Office Action in Japanese Application No. 2022-574830, dated Aug. 18, 2023, 4 pages including English translation.
(Continued)

*Primary Examiner* — Sagar Shrestha
(74) *Attorney, Agent, or Firm* — Morgan, Lewis & Bockius LLP

(57) ABSTRACT

Provided are a flexible screen support device and an intelligent terminal. The flexible screen support device includes a bending plate, a connection rope, and a driving mechanism. The bending plate includes multiple support blocks hingedly connected in sequence. The width of the upper part of each support block gradually decreases to form a rotation gap between adjacent support blocks. One part of the connection rope penetrates through the upper parts of the multiple support blocks. The other part of the connection rope penetrates through the lower parts of the multiple support blocks. The driving mechanism is configured to pull the one part of the connection rope so that the upper parts of adjacent support blocks are in contact with one another to bend the bending plate. The intelligent terminal includes a flexible screen and the described flexible screen support device.

19 Claims, 4 Drawing Sheets

(56) References Cited

U.S. PATENT DOCUMENTS

| | | | | |
|---|---|---|---|---|
| 10,019,036 | B2* | 7/2018 | Sun | G06F 1/1652 |
| 10,244,641 | B2* | 3/2019 | Seo | H05K 5/0017 |
| 10,599,186 | B2* | 3/2020 | Cho | G06F 1/1652 |
| 11,079,807 | B1* | 8/2021 | Robinson | G06F 1/1616 |
| 11,169,580 | B2* | 11/2021 | Lee | G09F 9/301 |
| 11,212,379 | B2* | 12/2021 | Baek | G06F 1/1652 |
| 2003/0030595 | A1* | 2/2003 | Radley-Smith | G06F 1/163 345/1.3 |
| 2014/0099479 | A1* | 4/2014 | Krall | H04M 1/0269 428/174 |
| 2014/0337621 | A1* | 11/2014 | Nakhimov | H04W 12/068 713/168 |
| 2015/0062840 | A1* | 3/2015 | Kim | H05K 5/0217 361/749 |
| 2015/0077917 | A1* | 3/2015 | Song | G06F 1/1652 361/679.27 |
| 2015/0089974 | A1* | 4/2015 | Seo | A44C 5/0076 63/1.13 |
| 2015/0325804 | A1* | 11/2015 | Lindblad | H10K 59/40 313/511 |
| 2016/0349802 | A1* | 12/2016 | Ahn | G06F 1/1681 |
| 2017/0365197 | A1* | 12/2017 | Kim | G06F 1/1641 |
| 2018/0124937 | A1 | 5/2018 | Choi et al. | |
| 2019/0268455 | A1* | 8/2019 | Baek | G06F 3/0412 |
| 2021/0030123 | A1* | 2/2021 | Wu | H04M 1/0268 |
| 2021/0084133 | A1* | 3/2021 | Cheng | H04M 1/0216 |
| 2022/0308632 | A1* | 9/2022 | Ivanov | G09F 9/30 |

FOREIGN PATENT DOCUMENTS

| | | |
|---|---|---|
| CN | 205847346 U | 12/2016 |
| CN | 10957460 A | 1/2019 |
| CN | 109164911 A | 1/2019 |
| CN | 208819536 U | 5/2019 |
| CN | 208919053 U | 5/2019 |
| CN | 109844683 A | 6/2019 |
| CN | 110661908 A | 1/2020 |
| CN | 110770814 A | 2/2020 |
| JP | 2005316297 A | 11/2005 |
| JP | 2007079271 A | 3/2007 |
| JP | 2012159853 A | 8/2012 |
| JP | 2019515763 A | 6/2019 |
| WO | WO2016083850 A2 | 6/2016 |
| WO | WO2017/006419 A1 | 1/2017 |
| WO | WO2019/201948 A1 | 10/2019 |

OTHER PUBLICATIONS

Extended European Search Report of Application No. 21822518.3, dated Mar. 15, 2024, 7 pages.
Chinese Search Report of Application No. 202010538106.2, dated Jun. 19, 2024, 4 pages including translation.
Chinese Office Action of Application No. 202010538106.2, dated Jun. 21, 2024, 10 pages including translation.
International Search Report in Application No. PCT/CN2021/096265, filed Aug. 25, 2021, 4 pages including English translation.

* cited by examiner

FLEXIBLE SCREEN SUPPORT DEVICE AND INTELLIGENT TERMINAL

CROSS-REFERENCE TO RELATED APPLICATIONS

This is a National Stage Application, filed under 35 U.S.C. 371, of International Patent Application No. PCT/CN2021/096265, filed on May 27, 2021, which claims priority to Chinese Patent Application No. 202010538106.2, filed with the China National Intellectual Property Administration (CNIPA) on Jun. 12, 2020, disclosures of which are incorporated herein by reference in their entireties.

TECHNICAL FIELD

The present application relates to the technical field of communications, for example, a flexible screen support device and an intelligent terminal.

BACKGROUND

A large-screen terminal can bring a user better audio-visual enjoyment of surfing the Internet and playing games, but the large-screen terminal is not convenient to carry. A small-screen terminal is convenient to carry, but the experience of surfing the Internet, playing games, and watching videos is not good enough. Therefore, there is a need for a terminal that can change the size of a display screen area according to the needs of the user and combines the dual advantages of the sensory enjoyment of a large screen and the portability of a small screen.

To meet the preceding requirements, an intelligent terminal with a deformable flexible screen emerges. A flexible screen can be bent freely to enable a display-type smart terminal product to get rid of an inherent rigid structure. Thus, a flexible screen terminal can change the size of the actual display screen area according to the needs of the user, thereby combining the sensory enjoyment of the large screen and the portability of the small screen. This has become an important development direction of smart terminal products.

Both a flexible screen terminal and a foldable screen terminal are manually operated to bend the flexible screen. During a bending process, the flexible screen may be damaged due to the excessive manual operation force of the user. At the same time, since the manual operation lacks convenience and the sense of science and technology, the user experience is poor.

SUMMARY

The present application provides a flexible screen support device and an intelligent terminal to avoid damage to a flexible screen during a bending process and improve the convenience and intelligence of products.

A flexible screen support device includes a bending plate, a connection rope, and a driving mechanism. The bending plate includes multiple support blocks hingedly connected in sequence. The width of the upper part of each support block gradually decreases to form a rotation gap between adjacent support blocks. One part of the connection rope penetrates through upper parts of the multiple support blocks. The other part of the connection rope penetrates through lower parts of the multiple support blocks. The driving mechanism is connected to the connection rope. The driving mechanism is configured to pull the one part of the connection rope so that the upper parts of adjacent support blocks are in contact with one another to bend the bending plate. The driving mechanism is also configured to pull the other part of the connection rope so that the upper parts of the adjacent support blocks are separated from one another to flatten the bending plate.

An intelligent terminal includes a flexible screen and the preceding flexible screen support device. The flexible screen is disposed on the flexible screen support device.

Figure 1:
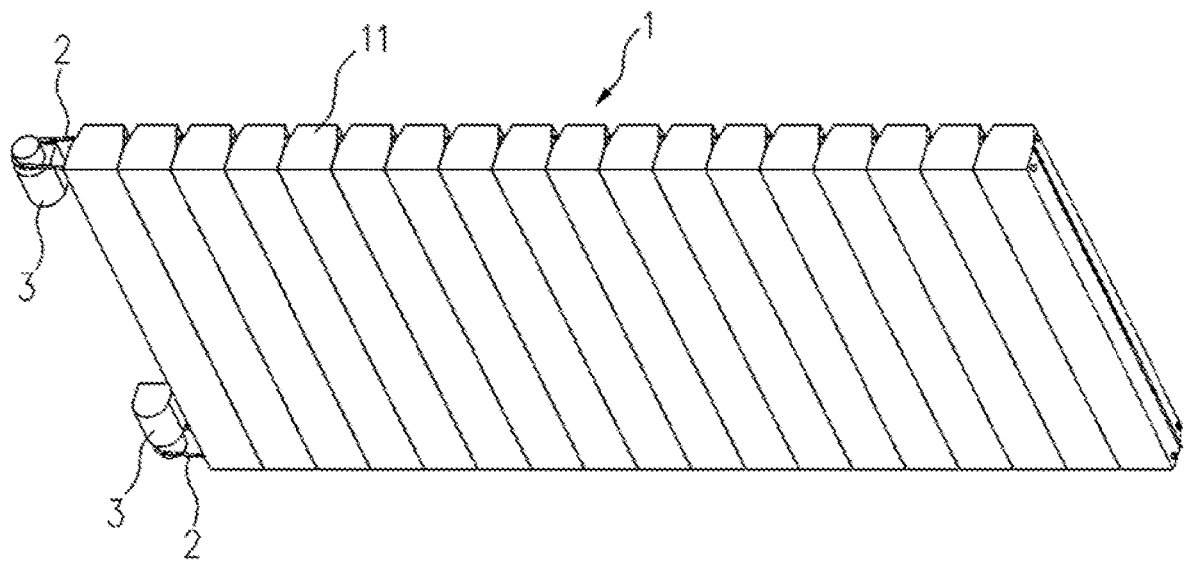
FIG. 1 is a diagram illustrating a structure of a flexible screen support device in a flattened state according to an embodiment of the present application.

REFERENCE LIST 1 bending plate
11 support block
111 mounting hole
12 connection rod
2 connection rope
3 driving mechanism

DETAILED DESCRIPTION

The present application is described hereinafter in conjunction with drawings and embodiments.

In the description of the present application, unless otherwise specified and limited, the term "connected to each other", "connected", or "secured" is to be construed in a broad sense, for example, as securely connected, detachably connected, or integrated; mechanically connected or electrically connected; directly connected to each other or indirectly connected to each other via an intermediary; or internally connected or interactional between two components. The meanings of the preceding terms in the present application may be understood according to situations.

In the present application, unless otherwise specified and limited, when a first feature is described as "above" or "below" a second feature, the first feature and the second feature may be in direct contact, or be in contact via another feature between the two features. Moreover, when the first feature is described as "on", "above", or "over" the second feature, the first feature is right on, above, or over the second feature or the first feature is obliquely on, above, or over the second feature, or the first feature is simply at a higher level than the second feature. When the first feature is described as "under", "below", or "underneath" the second feature, the first feature is right under, below, or underneath the second feature or the first feature is obliquely under, below, or underneath the second feature, or the first feature is simply at a lower level than the second feature.

In the description of the present application, it is to be understood that the orientation or position relationships indicated by terms "above", "below", "left" "right" and the like are based on the orientation or position relationships shown in the drawings, merely for facilitating description of the present application and simplifying operation, and these relationships do not indicate or imply that the referred device or element has a specific orientation and is constructed and operated in a specific orientation, and thus it is not to be construed as limiting the present application. Additionally, the terms "first" and "second" in the specification are only used for descriptive purposes and have no special meanings.

Figure 2:
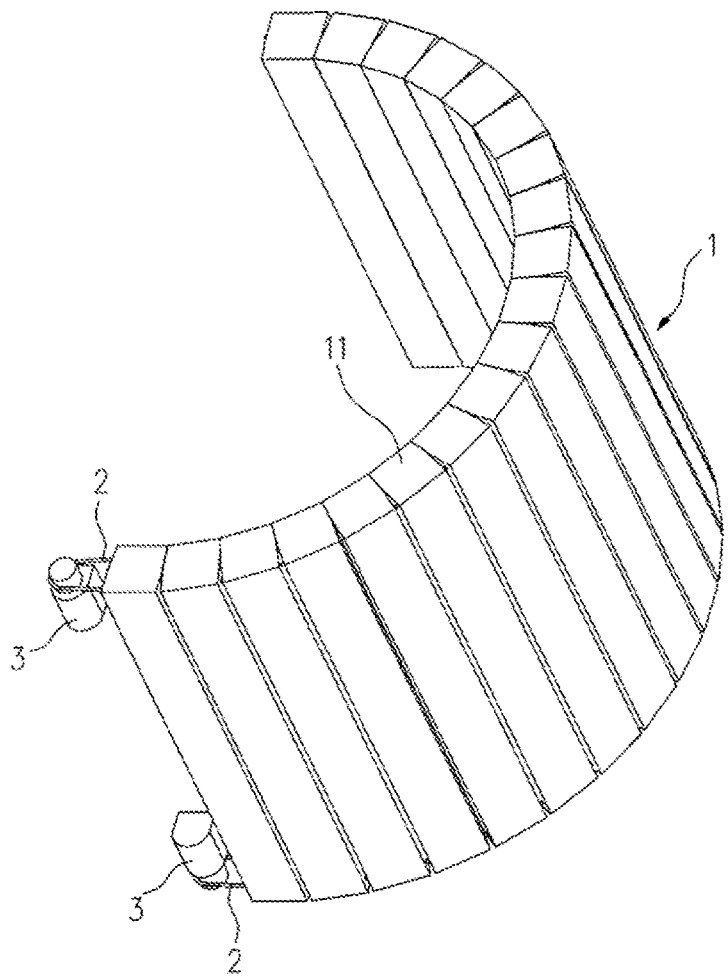
FIG. 2 is a diagram illustrating a structure of a flexible screen support device in a bent state according to an embodiment of the present application.

FIG. 1 is a diagram illustrating the structure of a flexible screen support device in a flattened state according to an embodiment of the present application. FIG. 2 is a diagram illustrating the structure of a flexible screen support device in a bent state according to an embodiment of the present application. Referring to FIG. 1 and FIG. 2, this embodiment of the present application provides a flexible screen support device applied to a bendable flexible screen product. The bendable flexible screen product includes, but not limited to, a smartphone, a smart wristwatch, and a smart tablet. The flexible screen support device includes a bending plate 1, a connection rope 2, and a driving mechanism 3. The bending plate 1 has a surface configured to support a flexible screen and may be bent to have a bent state and a flattened state such that the flexible screen is bent and flattened correspondingly. The bending plate 1 includes multiple support blocks 11 hingedly connected in sequence. Surfaces of at least one side of the multiple support blocks 11 together constitute a surface configured to support the flexible screen. The width of the upper part of each support block 11 gradually decreases, that is, the width of the upper part of a support block 11 is smaller than the width of the lower part of the support block 11. When the bending plate 1 is in the flattened state, upper parts of two adjacent support blocks 11 form a rotation gap. When the bending plate 1 is in the bent state, the upper parts of two adjacent support blocks 11 are in contact with each other. The bending plate 1 is bent and deformed through a mutual cooperation of the multiple support blocks 11 hingedly connected in sequence, thereby implementing the conversion of the flexible screen support device between the bent state and the flattened state. In this embodiment of the present application, the "upper part" refers to the upper portion of a support block 11 in FIG. 1, and the "lower part" refers to the lower portion of a support block 11 in FIG. 1. These terms are merely for facilitating description and do not indicate or imply that the support block 11 must have a specific orientation.

In this embodiment of the present application, the connection rope 2 may be a thin rope of a soft elastic material. One part of the connection rope 2 penetrates through the upper parts of the multiple support blocks 11 in sequence. The other part of the connection rope 2 penetrates through the lower parts of the multiple support blocks 11 in sequence. When the bending plate 1 is in the flattened state, the upper parts of the multiple support blocks 11 are tightened and the lower parts of the multiple support blocks 11 are loosened by the connection rope 2. Thus, the upper parts of the multiple support blocks 11 in the bending plate 1 can be attached in sequence, the lower parts of the multiple support blocks 11 appear gaps, and the bending plate 1 is bent towards the direction of the upper parts. When the bending plate 1 is in the bent state, the lower parts of the multiple support blocks 11 are tightened and the upper parts of the multiple support blocks 11 are loosened by the connection rope 2. Thus, the lower parts of two adjacent support blocks 11 in the bending plate 1 can be attached in sequence, the upper parts of two adjacent support blocks 11 appear gaps, and the bending plate 1 is flattened towards the direction of the lower parts. In this embodiment, the connection rope 2 is connected to the driving mechanism 3. Thus, the connection rope 2 can be tightened or loosened under the driving of the driving mechanism 3. The driving mechanism 3 is connected to a control apparatus in a signal manner, and by cooperating with the software control system of an intelligent terminal, the bending or flattening of the flexible screen can be implemented by one-key operation.

In this embodiment of the present application, the bending angle of the flexible screen support device may be set in advance and may be set according to the material performance of the flexible screen, the use scenario of a user, or the like, to ensure that the flexible screen can be maintained at a proper bend radius during bending, without being damaged due to a too small bend radius or an excessive force. Moreover, the flexible screen support device can provide reliable hard support for the flexible screen when the flexible screen is flattened. The preceding preset bending angle is not limited to one, and multiple bending angles may also be set to meet the requirements of safe use. A user can implement the conversion of the flexible screen between different bent states through a software control system.

In this embodiment of the present application, a flexible screen support device capable of automatically bending is provided. The connection rope 2 is driven by the driving mechanism 3. When the upper part of the bending plate 1 is tightened by the connection rope 2, upper parts of two adjacent support blocks 11 in the bending plate 1 are in contact with each other, and the bending plate 1 is in the bent state. When the lower part of the bending plate 1 is tightened by the connection rope 2, the upper parts of two adjacent support blocks 11 in the bending plate 1 have a rotation gap, and the bending plate 1 is in the flattened state. Thus, automatic bending and automatic flattening of the flexible screen are implemented. The present application implements the automatic bending and automatic flattening of the flexible screen, ensures the use safety of the flexible screen, enhances the convenience and intelligence of the product, makes the product more scientific and technical, and helps to improve the user experience.

In this embodiment, the driving mechanism 3 may be a motor, and the connection rope 2 is a whole rope. One end of the connection rope 2 is secured to the upper part of the support block 11 at an end (that is, the end facing away from the driving mechanism 3). The other end of the connection rope 2 is secured to the lower part of the support block 11 at the end. The middle portion of the connection rope 2 is secured to the output shaft of the motor. Thus, when the motor is rotated, one end of the connection rope 2 may be tightened, and the other end of the connection rope 2 may be loosed. In this embodiment, at least two groups of connection ropes 2 and at least two groups of motors may be provided. The at least two groups of connection ropes 2 are uniformly distributed along the length direction of the support blocks 11. The at least two groups of connection ropes 2 are connected to the at least two groups of motors in a one-to-one manner. This arrangement can improve the movement balance of the bending plate 1 to form a better support for the flexible screen. In other embodiments, only one group of motors may be provided. Through the cooperation between the one group of motors and a transmission system, multiple groups of connection ropes 2 can be driven to move, thereby simplifying the structure and saving the cost.

Figure 3:
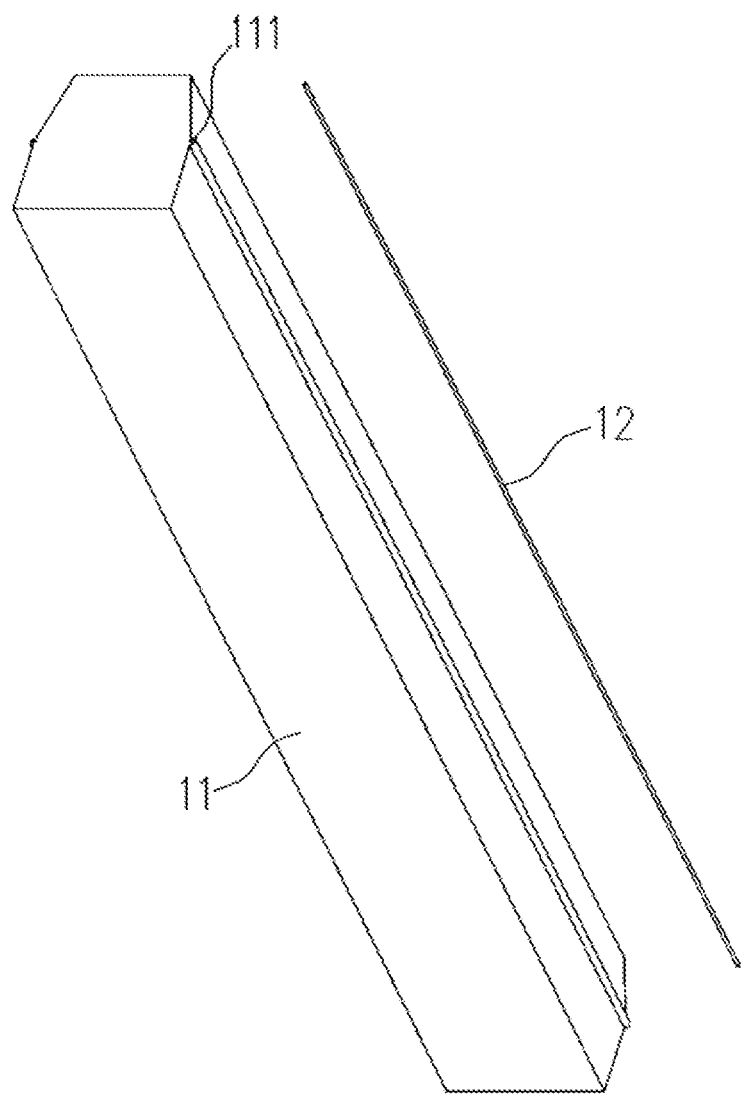
FIG. 3 is a diagram illustrating an exploded structure of a support block and a connection rod according to an embodiment of the present application.
Figure 4:
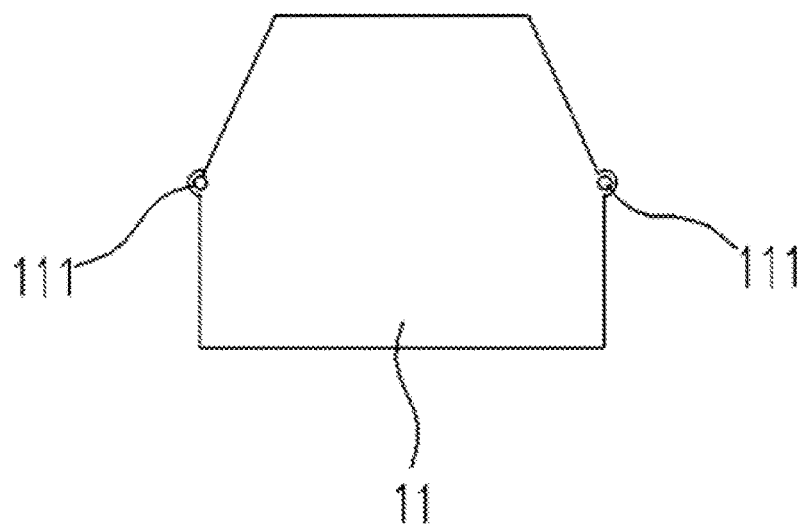
FIG. 4 is a cross-sectional diagram of a support block according to an embodiment of the present application.

FIG. 3 is a diagram illustrating an exploded structure of a support block 11 and a connection rod 12 according to an embodiment of the present application. FIG. 4 is a cross-sectional diagram of a support block 11 according to an embodiment of the present application. Referring to FIG. 3 and FIG. 4, in this embodiment, the support block 11 may have a columnar structure. The shapes and sizes of multiple support blocks 11 are the same. The upper cross section of the support block 11 is in a shape of a trapezoid. The lower cross section of the support block 11 is in a shape of a rectangle. The base length of the trapezoid is the same as the top length of the rectangle, that is, the entire cross section of the support block 11 is in a shape of a hexagon. In this embodiment, the lower end surface of the support block 11 may be provided to abut the flexible screen. The preceding trapezoidal structure not only makes the width of the upper part of the support block 11 smaller than the width of the lower part of the support block 11, but also increases the contact area between the lower end surface of the support block 11 and the flexible screen, thereby improving the support effect of the support block 11 on the flexible screen. In an embodiment, the upper cross section of the support block 11 may be in a shape of an isosceles trapezoid. Thus, two sides of the support block 11 are subjected to relatively uniform forces, the folding performance of the bending plate 1 is better improved, and the folding performance of the intelligent terminal is further improved. In this embodiment, the bending degree of the bending plate 1 is related to the shape, size, and number of the support blocks 11 and the size of the rotation gap. For example, the foldable degree of the support block 11 may be adjusted through adjusting the base angle of the preceding isosceles trapezoid. The larger the base angle of the isosceles trapezoid is, the smaller the foldable degree of the single support block 11 is, and in the entire bending plate 1, the more support blocks 11 are required to achieve the same bending degree. In application, the shape and the number of support blocks 11 can be set according to actual requirements and are not limited to this embodiment.

With continued reference to FIG. 3, in this embodiment, the bending plate 1 also includes connection rods 12. The side wall of the support block 11 is provided with a mounting hole 111. A connection rod 12 is inserted through mounting holes 111 of two adjacent support blocks 11. In this embodiment, two adjacent support blocks 11 are connected hingedly by using the connection rod 12 as a rotating shaft, and the structure is simple and the installation is convenient. In other embodiments, the hinged connection among the support blocks 11 may be implemented in other manners and is not limited to this embodiment. In this embodiment, the support blocks 11 and the connection rod 12 are each made of a hard material, such as a metal or a hard plastic, to increase the overall support performance and bending reliability of the bending plate 1.

Figure 5:
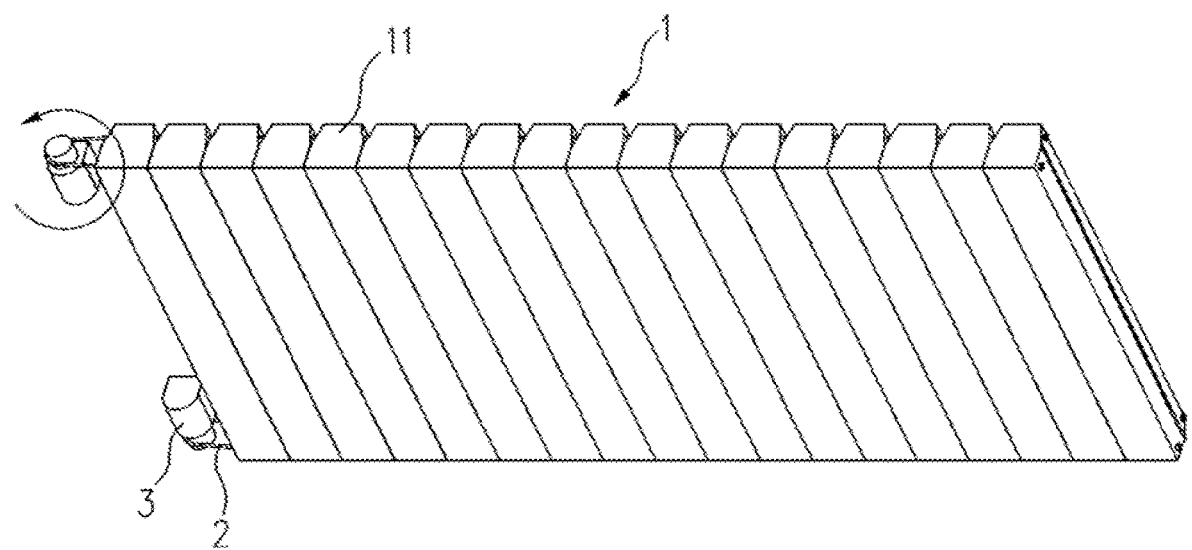
FIG. 5 is a diagram illustrating a bending process of a flexible screen support device according to an embodiment of the present application.
Figure 6:
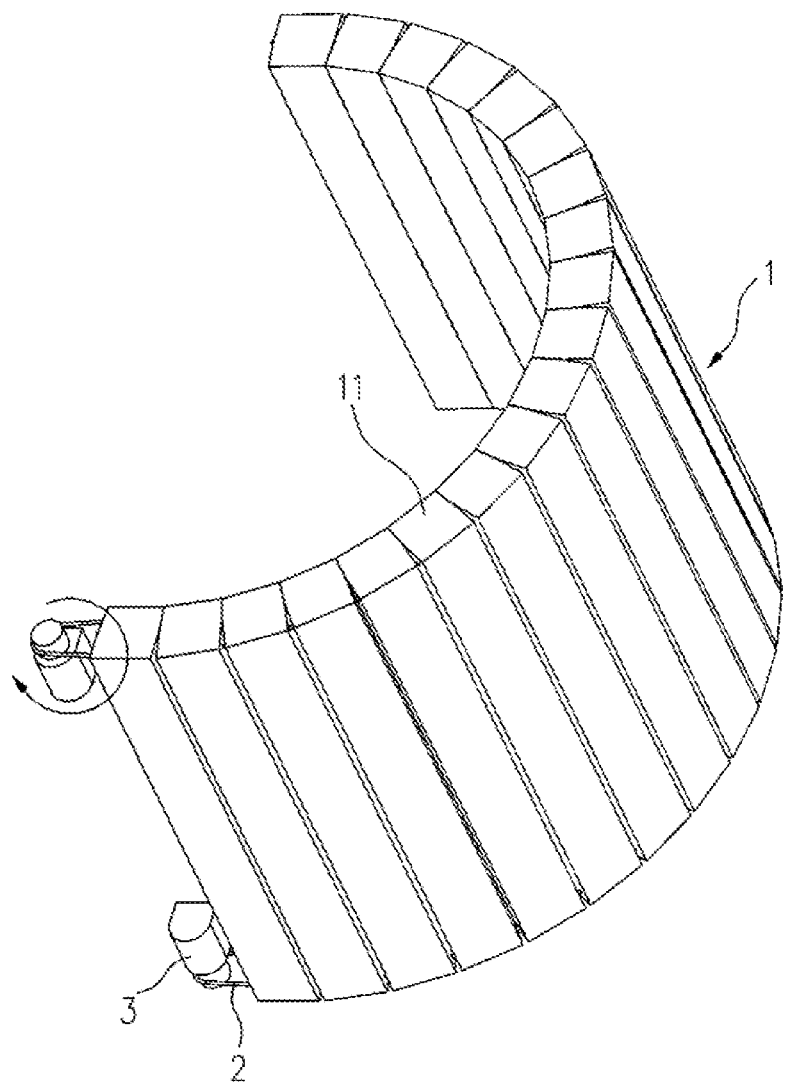
FIG. 6 is a diagram illustrating a flattening process of a flexible screen support device according to an embodiment of the present application.

FIG. 5 is a diagram illustrating a bending process of a flexible screen support device according to an embodiment of the present application. FIG. 6 is a diagram illustrating a flattening process of a flexible screen support device according to an embodiment of the present application. Referring to FIG. 5 and FIG. 6, the working principle of this embodiment is described below.

As shown in FIG. 5, when the whole machine is in the flattened state and needs to be bent, a software system controls the output shaft of the motor to rotate counterclockwise along the direction shown by the arrow in FIG. 5, thereby driving the connection rope 2 to rotate counterclockwise along with the output shaft of the motor. The connection rope 2 pulls the upper half of the bending plate 1 to be tightened and the lower half of the bending plate 1 to be loosened. Since the upper halves of the support block 11 is a trapezoidal structure, the upper half of multiple support blocks 11 are pressed against one another one by one so that the entire bending plate 1 is automatically bent. A final state is shown in FIG. 2.

As shown in FIG. 6, when the whole machine is in the bent state and needs to be flattened, the software system controls the output shaft of the motor to rotate clockwise along the direction shown by the arrow in FIG. 6, thereby driving the connection rope 2 to rotate clockwise along with the output shaft of the motor. The connection rope 2 pulls the lower half of the bending plate 1 to be tightened and the upper half of the bending plate 1 to be loosened. Since the lower half of the support block 11 is a trapezoidal structure, the lower halves of multiple support blocks 11 are pressed against one another one by one so that the entire bending plate 1 is automatically flattened. A final state is shown in FIG. 1.

An embodiment of the present application provides an intelligent terminal. The intelligent terminal includes a flexible screen and the preceding flexible screen support device. The flexible screen is disposed on the flexible screen support device. In an embodiment, the flexible screen is adhesively attached to the lower end surfaces of the multiple support blocks 11. In this embodiment, the intelligent terminal may be a smartphone, a smartwatch, a smart tablet, or the like. For example, when the intelligent terminal is a smart wristwatch, the smart wristwatch may be bent and folded into a shape of a band by the control of a software interface to facilitate a user to wear the wristwatch on the wrist. This embodiment implements the automatic bending and flattening of the intelligent terminal, avoids damage to the flexible screen of the intelligent terminal caused by manual operation, improves the convenience and intelligence of the product, and helps to improve the user experience.

What is claimed is:

1. A flexible screen support device, comprising:
a bending plate, wherein the bending plate comprises a plurality of support blocks hingedly connected in sequence, lower end surfaces of the plurality of support blocks are configured to abut and conform to a flexible screen, a width of an upper part of each of the plurality of support blocks gradually decreases to form a rotation gap between adjacent support blocks of the plurality of support blocks, each of the plurality of support blocks has a columnar structure, an upper cross section of each of the plurality of support blocks is in a shape of a trapezoid, and a lower cross section of each of the plurality of support blocks is in a shape of a rectangle;
a connection rope, wherein one part of the connection rope penetrates through upper parts of the plurality of support blocks, and another part of the connection rope penetrates through lower parts of the plurality of support blocks; and
a driving mechanism connected to the connection rope, wherein the driving mechanism is configured to pull the one part of the connection rope so that upper parts of adjacent support blocks of the plurality of support blocks are in contact with one another to bend the bending plate, and the driving mechanism is further configured to pull the another part of the connection rope so that the upper parts of the adjacent support blocks of the plurality of support blocks are separated from one another to flatten the bending plate.

2. The flexible screen support device according to claim 1, wherein the plurality of support blocks have a same shape and a same size.

3. The flexible screen support device according to claim 2, wherein the driving mechanism is a motor, one end of the connection rope is secured to an upper part of a support block of the plurality of support blocks at an end, another end of the connection rope is secured to a lower part of the support block at the end, and a middle part of the connection rope is secured to an output shaft of the motor, wherein the end is an end facing away from the driving mechanism.

4. The flexible screen support device according to claim 1, wherein the bending plate further comprises a connection rod, a side wall of each of the plurality of support blocks is provided with a mounting hole, and the connection rod is inserted through mounting holes of two adjacent support blocks of the plurality of support blocks so that the two adjacent support blocks are connected hingedly.

5. The flexible screen support device according to claim 4, wherein the plurality of support blocks and the connection rod are each made of a hard material.

6. The flexible screen support device according to claim 5, wherein the driving mechanism is a motor, one end of the connection rope is secured to an upper part of a support block of the plurality of support blocks at an end, another end of the connection rope is secured to a lower part of the support block at the end, and a middle part of the connection rope is secured to an output shaft of the motor, wherein the end is an end facing away from the driving mechanism.

7. The flexible screen support device according to claim 4, wherein the driving mechanism is a motor, one end of the connection rope is secured to an upper part of a support block of the plurality of support blocks at an end, another end of the connection rope is secured to a lower part of the support block at the end, and a middle part of the connection rope is secured to an output shaft of the motor, wherein the end is an end facing away from the driving mechanism.

8. The flexible screen support device according to claim 1, wherein the driving mechanism is a motor, one end of the connection rope is secured to an upper part of a support block of the plurality of support blocks at an end, another end of the connection rope is secured to a lower part of the support block at the end, and a middle part of the connection rope is secured to an output shaft of the motor, wherein the end is an end facing away from the driving mechanism.

9. The flexible screen support device according to claim 8, wherein at least two groups of connection ropes and at least two groups of driving mechanisms are provided, the at least two groups of connection ropes are uniformly distributed along a length direction of the plurality of support blocks, and each group of the at least two groups of connection ropes is correspondingly connected to one group of the at least two groups of driving mechanisms.

10. The flexible screen support device according to claim 1, wherein the connection rope is a rope of a soft elastic material.

11. An intelligent terminal, comprising a flexible screen and a flexible screen support device, wherein the flexible screen is disposed on the flexible screen support device; and the flexible screen support device comprises a bending plate, a connection rope, and a driving mechanism;
wherein the bending plate comprises a plurality of support blocks hingedly connected in sequence, lower end surfaces of the plurality of support blocks are configured to abut and conform to the flexible screen, a width of an upper part of each of the plurality of support blocks gradually decreases to form a rotation gap between adjacent support blocks of the plurality of support blocks, each of the plurality of support blocks has a columnar structure, an upper cross section of each of the plurality of support blocks is in a shape of a trapezoid, and a lower cross section of each of the plurality of support blocks is in a shape of a rectangle;
wherein one part of the connection rope penetrates through upper parts of the plurality of support blocks, and another part of the connection rope penetrates through lower parts of the plurality of support blocks; and
wherein the driving mechanism is connected to the connection rope, the driving mechanism is configured to pull the one part of the connection rope so that upper parts of adjacent support blocks of the plurality of support blocks are in contact with one another to bend the bending plate, and the driving mechanism is further configured to pull the another part of the connection rope so that the upper parts of the adjacent support blocks of the plurality of support blocks are separated from one another to flatten the bending plate.

12. The intelligent terminal according to claim 11, wherein the plurality of support blocks have a same shape and a same size.

13. The intelligent terminal according to claim 12, wherein the driving mechanism is a motor, one end of the connection rope is secured to an upper part of a support block of the plurality of support blocks at an end, another end of the connection rope is secured to a lower part of the support block at the end, and a middle part of the connection rope is secured to an output shaft of the motor, wherein the end is an end facing away from the driving mechanism.

14. The intelligent terminal according to claim 11, wherein the bending plate further comprises a connection rod, a side wall of each of the plurality of support blocks is provided with a mounting hole, and the connection rod is inserted through mounting holes of two adjacent support blocks of the plurality of support blocks so that the two adjacent support blocks are connected hingedly.

15. The intelligent terminal according to claim 14, wherein the plurality of support blocks and the connection rod are each made of a hard material.

16. The intelligent terminal according to claim 14, wherein the driving mechanism is a motor, one end of the connection rope is secured to an upper part of a support block of the plurality of support blocks at an end, another end of the connection rope is secured to a lower part of the support block at the end, and a middle part of the connection rope is secured to an output shaft of the motor, wherein the end is an end facing away from the driving mechanism.

17. The intelligent terminal according to claim 11, wherein the driving mechanism is a motor, one end of the connection rope is secured to an upper part of a support block of the plurality of support blocks at an end, another end of the connection rope is secured to a lower part of the support block at the end, and a middle part of the connection rope is secured to an output shaft of the motor, wherein the end is an end facing away from the driving mechanism.

18. The intelligent terminal according to claim 17, wherein at least two groups of connection ropes and at least two groups of driving mechanisms are provided, the at least two groups of connection ropes are uniformly distributed along a length direction of the plurality of support blocks, and each group of the at least two groups of connection ropes is correspondingly connected to one group of the at least two groups of driving mechanisms.

19. The intelligent terminal according to claim 11, wherein the connection rope is a rope of a soft elastic material.

\* \* \* \* \*